United States Patent
Maugerard

(10) Patent No.: US 12,360,539 B2
(45) Date of Patent: Jul. 15, 2025

(54) INSTRUMENTED DEVICE FOR A MIXING VALVE, AS WELL AS A MIXING VALVE COMPRISING SUCH AN INSTRUMENTED DEVICE

(71) Applicant: VERNET, Ollainville (FR)

(72) Inventor: Benoît Robert Simon Maugerard, Brunoy (FR)

(73) Assignee: VERNET, Ollainville (FR)

( * ) Notice: Subject to any disclaimer, the term of this patent is extended or adjusted under 35 U.S.C. 154(b) by 352 days.

(21) Appl. No.: 17/906,452

(22) PCT Filed: Mar. 18, 2021

(86) PCT No.: PCT/EP2021/056959
§ 371 (c)(1),
(2) Date: Sep. 15, 2022

(87) PCT Pub. No.: WO2021/185972
PCT Pub. Date: Sep. 23, 2021

(65) Prior Publication Data
US 2023/0112960 A1    Apr. 13, 2023

(30) Foreign Application Priority Data
Mar. 18, 2020  (FR) ...................... 2002654

(51) Int. Cl.
*G05D 23/13*   (2006.01)
*E03C 1/04*    (2006.01)

(52) U.S. Cl.
CPC ......... *G05D 23/1393* (2013.01); *E03C 1/04* (2013.01); *E03C 2001/0418* (2013.01); *E03C 2201/30* (2013.01); *Y10T 137/9464* (2015.04)

(58) Field of Classification Search
CPC . E03C 1/04; E03C 1/055; E03C 1/057; E03C 2201/30; E03C 2001/0418; Y10T 137/9464; G05D 23/1393
(Continued)

(56) References Cited

U.S. PATENT DOCUMENTS 4,520,516 A * 6/1985 Parsons ................... E03C 1/057
367/96
5,033,671 A * 7/1991 Shiba ................. G05D 23/1393
236/12.12
(Continued)

FOREIGN PATENT DOCUMENTS

CN       1068869 A    2/1993
CN       1546952 A    11/2004
(Continued)

OTHER PUBLICATIONS

Search Report for French Application No. 2002654 dated Sep. 21, 2020.
(Continued)

*Primary Examiner* — Daphne M Barry
(74) *Attorney, Agent, or Firm* — McDonald Hopkins LLC

(57) ABSTRACT

The instrumented device comprises a body to be attached to a mixing valve producing a mixed fluid by blending hot and cold fluids. The body defines a main channel and a bypass channel, provided for the outflow of the mixed fluid through the body. The device comprises a turbine arranged in the main channel, being bypassed by the bypass channel, such that, as soon as the flow rate of the mixed fluid flowing through the body is non-zero, all or a portion of the mixed fluid flowing through the body passes through the main channel passing through the turbine and, at the same time, a portion of the mixed fluid flowing through the body is likely (Continued)

to bypass the turbine by flowing in the bypass channel between the upstream and the downstream of the turbine.

14 Claims, 10 Drawing Sheets

(58) Field of Classification Search
USPC .......................................................... 137/801
See application file for complete search history.

(56) References Cited

U.S. PATENT DOCUMENTS

| | | | |
|---|---|---|---|
| 5,349,985 A | 9/1994 | Fischer | |
| 5,935,426 A * | 8/1999 | Giordano | C02F 1/003 210/138 |
| 6,019,130 A * | 2/2000 | Rump | E03C 1/057 137/601.01 |
| 6,257,493 B1 * | 7/2001 | Chamot | F16K 19/006 236/12.13 |
| 7,740,182 B2 * | 6/2010 | Lum | F24D 17/00 236/12.13 |
| 8,210,441 B2 * | 7/2012 | Kempf | E03B 7/045 236/12.13 |
| 9,081,392 B2 * | 7/2015 | Kline | G05D 23/134 |
| 9,726,232 B2 | 8/2017 | Arhab et al. | |
| 11,360,497 B2 * | 6/2022 | Marquier | G05D 23/1346 |
| 2018/0274792 A1 | 9/2018 | Shaffer | |
| 2020/0341497 A1 * | 10/2020 | Mace | F16K 19/00 |

FOREIGN PATENT DOCUMENTS

| | | |
|---|---|---|
| CN | 102678971 A | 9/2012 |
| CN | 204151093 U | 2/2015 |
| EP | 1048997 A1 | 11/2000 |
| FR | 2774740 A1 | 8/1999 |
| FR | 2869096 A1 | 10/2005 |
| FR | 2916033 A1 | 11/2008 |
| FR | 2921709 A1 | 4/2009 |
| FR | 3027077 A1 | 4/2016 |
| FR | 3076918 A1 | 7/2019 |
| JP | H04281121 A | 10/1992 |
| JP | 2005105529 A | 4/2005 |
| JP | 2011220645 A | 11/2011 |
| WO | 0212760 A1 | 2/2002 |
| WO | 2018060658 A1 | 4/2018 |
| WO | 2019138027 A1 | 7/2019 |

OTHER PUBLICATIONS

Search Report for International Application No. PCT/EP2021/056959 dated May 5, 2021.

* cited by examiner

INSTRUMENTED DEVICE FOR A MIXING VALVE, AS WELL AS A MIXING VALVE COMPRISING SUCH AN INSTRUMENTED DEVICE

CROSS-REFERENCE TO RELATED APPLICATIONS

This is the National Stage of PCT international application PCT/EP2021/056959, filed on Mar. 18, 2021, which claims the priority of French Patent Application No. 2002654, filed Mar. 18, 2020, both of which are incorporated herein by reference in their entirety.

The present invention relates to an instrumented device for a mixing valve. It also relates to a mixing valve comprising such an instrumented device.

The invention relates more generally to the field of sanitary facilities for distributing a fluid, in particular for distributing water, such as a shower, a bathtub or a washbasin. Mixing valves are used to mix a hot fluid and a cold fluid to produce a mixed fluid that presents an intermediate temperature between the temperature of the cold fluid and the temperature of the hot fluid. The value of this intermediate temperature depends on the respective temperatures of the cold and hot fluids, as well as the respective proportions of the cold and hot fluids in the mixed fluid resulting from the mixing of the two fluids. Such mixing valves may be thermostatic, in the sense that the value of the temperature of the mixed fluid is adjustable by the user of the mixing valve: in this case, the mixing valve incorporates a thermostatic control device, typically a thermostatic cartridge, which is added into the mixing valve.

WO 2019/138027 proposes an instrumented thermostatic control device, which collects data on the use of a thermostatic mixing valve, for example the amount of mixed water consumed and the temperatures involved and transmits this data to the outside of the mixing valve via a wireless communication interface. This thermostatic control device includes a temperature sensor to measure the temperature of the mixed fluid flowing through the device. This thermostatic control device may also comprise a hydraulic turbine, through which the mixed fluid flowing through the device passes and which thus makes it possible both to recharge a battery integrated into the device and to supply a signal that is processed by an ad hoc calculator integrated into the device to determine the flow rate of the mixed fluid flowing through the device. In all embodiments of WO 2019/138027, all of the mixed fluid flowing through the device passes through the turbine, without the turbine being able to be bypassed. Although this thermostatic control device presents real interest in connection with the development of home automation applications, the presence of the components necessary for thermostatic control induces constraints for the structure of the device, particularly with respect to its size and with respect to its installation in existing mixing valves. Moreover, the presence of the turbine tends to limit the maximum permissible flow rate with which the mixed fluid can pass through the device, in the sense that exposing the turbine to an excessively high flow rate of mixed fluid risks damaging it or, at the very least, significantly reducing its performance and service life.

The object of the present invention is to provide a new instrumented device for a mixing valve, which is particularly convenient, adaptable and efficient.

To this end, the subject matter of the invention is an instrumented device for a mixing valve, comprising:
a body that:
   is able to be added to a mixing valve provided for producing a mixed fluid by mixing between a hot fluid and a cold fluid which are supplied to the mixing valve, and
   delimits a main channel and a bypass channel, which are provided for flow of the mixed fluid through the body
a turbine which is arranged in the main channel, being bypassed by the bypass channel, so that, when a flow rate of the mixed fluid flowing through the body is not zero all or part of the mixed fluid flowing through the body passes through the main channel through the turbine and, at the same time, part of the mixed fluid flowing through the body is able to bypass the turbine by flowing in the bypass channel between upstream and downstream of the turbine, and
an electronic circuit, which is arranged in a dry area of the body, and which is connected to the turbine by a first electrical connection which is carried by the body,
which electronic circuit comprises:
   a calculator which is able to determine a flow rate value for the flow rate of the mixed fluid flowing through the body, from a signal supplied by the turbine via the first electrical connection, and
   an electrical power source, which is rechargeable and is adapted both to electrically power the calculator and to be electrically powered by the turbine via the first electrical connection.

The instrumented device according to the invention is autonomous, in the sense that it constitutes an assembly, or an assembly, which is self-sufficient, in particular from the energy point of view and from the hydraulic point of view, and which can be added in one piece to the inside of a valve body of a mixing valve, whether the latter is thermostatic or not. In other words, the instrumented device according to the invention is akin to a module that is designed to be installed in an existing mixing valve in order to add to the latter at least one autonomous function for measuring the flow rate of the mixed fluid produced by the mixing valve. Moreover, thanks to the arrangement of the turbine in a main channel of the body of the instrumented device according to the invention and to the presence of a bypass channel in this body, the device allows the turbine to be bypassed by the mixed fluid passing through the body of the device: in this way, in particular when the flow rate of the mixed fluid passing through the device is high, the turbine is protected, in particular by avoiding operating in overspeed. At the same time, the calculator of the instrumented device according to the invention is provided, by means of its prior ad hoc programming as explained in detail hereinafter, to determine the flow rate of the mixed fluid passing through the body of the device, that is, the total flow rate of this mixed fluid, namely, the flow rate of the part of this mixed fluid which passes through the main channel through the turbine and the flow rate of the part of the mixed fluid which, if necessary, passes through the bypass channel, in other words, passes through the body without passing through the turbine. The instrumented device according to the invention is thus practical and efficient. According to one embodiment that will be detailed later, a differential pressure valve is provided in the bypass channel so that all of the mixed fluid passes through the turbine when the flow rate of the mixed fluid through the body of the device is low.

In any case, the instrumented device according to the invention is advantageously compact, which allows it to be installed in a very large number of mixing valves, thermostatic or not, in an easy way, in particular without modifying their external design.

Moreover, due to its autonomy and modularity, the instrumented device according to the invention can advantageously be equipped with additional measuring sensors to measure other hydraulic characteristics of the mixed fluid passing through the body of the device, other than its flow rate, its other hydraulic characteristics may be, in particular, the temperature of the mixed fluid, but also, for example, the pressure, the hardness, the pH, the potability, the level of a chemical compound such as lead or a pesticide, or even the microbial activity of the mixed fluid. Furthermore, as will be presented in more detail hereinafter, the instrumented device according to the invention can advantageously be arranged to measure the temperature and, if necessary, other hydraulic characteristics of the cold fluid before the latter is mixed in the mixing valve with the hot fluid. Also, as will be presented in more detail below, the instrumented device according to the invention advantageously makes it possible to transmit the data determined by its calculator outside the device, and this by means of a wireless communication interface, integrated into the electronic circuit of the device, and/or by means of an electrical connection connecting the electronic circuit to a remote device, such as a display device, of the mixing valve, it being possible for the remote device to be electrically powered by the electrical power source of the instrumented device. More generally, the adaptability of the instrumented device according to the invention is remarkable.

According to additional advantageous features of the instrumented device according to the invention:

The instrumented device further includes a differential pressure valve, which is arranged in the bypass channel and is designed to switch between a closed configuration, in which the valve interrupts flow of the mixed fluid in the bypass channel when the pressure difference between upstream and downstream of the valve is less than a predetermined threshold, and an open configuration, in which the valve allows the mixed fluid to flow into the bypass channel downstream of the valve when the pressure difference between upstream and downstream of the valve is greater than said predetermined threshold.

The differential pressure valve is designed to cause a flow rate of the mixed fluid in the bypass channel to increase gradually as a function of the pressure difference between upstream and downstream of the valve over a range of at least 250 mbar.

The instrumented device further includes a first temperature sensor that is able to measure the temperature of the mixed fluid flowing through the body, the electronic circuit is connected to the first temperature sensor by a second electrical connection that is carried by the body, and the calculator is also able to determine a first temperature value for the temperature of the mixed fluid flowing through the body, from a signal provided by the first temperature sensor via the second electrical connection.

The first temperature sensor is integrated within the turbine.

The first electrical connection and the second electrical connection are combined into a bus.

The body further delimits an additional channel that is provided for flow of the cold fluid through the body, the instrumented device further includes a second temperature sensor that is able to measure the temperature of the cold fluid flowing through the body, the electronic circuit is connected to the second temperature sensor by a third electrical connection that is carried by the body, and the calculator is also able to determine a second temperature value for the temperature of the cold fluid flowing through the body, from a signal supplied by the second temperature sensor via the third electrical connection.

The electronic circuit further comprises a wireless communication interface, which is able to transmit to exterior of the instrumented device, via a wireless communication protocol, data determined by the calculator.

The instrumented device further includes a fourth electrical connection which is able to connect the electronic circuit to a remote device, separate from the body, so as to, both, electrically power the remote device from the electrical power source and transmit to the remote device data determined by the calculator.

The invention also has as its object a mixing valve, comprising:

a valve body which is provided with a hot fluid inlet provided to be supplied with a hot fluid, a cold fluid inlet provided to be supplied with a cold fluid, and at least one mixed fluid outlet provided to discharge to the outside of the valve body a mixed fluid resulting from the mixing inside the valve body between the hot fluid and the cold fluid, and an instrumented device, which is as defined above and the body of which is arranged inside the valve body such that the main channel and the bypass channel are fluidically connected to the at least one mixed fluid outlet.

According to additional advantageous features of this mixing valve:

The mixing valve further includes a display device, which is integral with the valve body, separate from the body of the instrumented device, and electrically connected to the electronic circuit of the instrumented device so as to be electrically supplied by the electrical power source and to receive data from the calculator.

The mixing valve further comprises:

a flow control device, which is arranged inside the valve body, and which is able to control the flow rate of the mixed fluid sent to the at least one mixed fluid outlet, and a thermostatic control device, in particular a pre-assembled thermostatic cartridge, which is arranged inside the valve body and which is able to mix the hot fluid from the hot fluid inlet and the cold fluid from the cold fluid inlet and to control the temperature of the mixed fluid supplied to the at least one mixed fluid outlet, the body of the instrumented device being arranged between the flow control device and the thermostatic control device.

The valve body presents an elongated shape, the hot fluid inlet and the cold fluid inlet are separated from each other along the valve body, the thermostatic control device is located, along the valve body, at the same level as the hot fluid inlet, and the additional channel of the body of this instrumented device is fluidically connected to the cold fluid inlet.

The invention will be better understood upon reading the following description, given only by way of example and made with reference to the drawings in which.

In FIGS. 1 to 4 is shown a mixing valve 1 for dispensing a fluid, such as water. The fluid dispensed by the mixing valve 1 is hereafter called "mixed fluid" and results from the mixing, inside the mixing valve, of a cold fluid and a hot fluid. The mixing valve 1 is typically provided to equip a sanitary facility, such as a shower, a bathtub or a washbasin.

Figure 1:
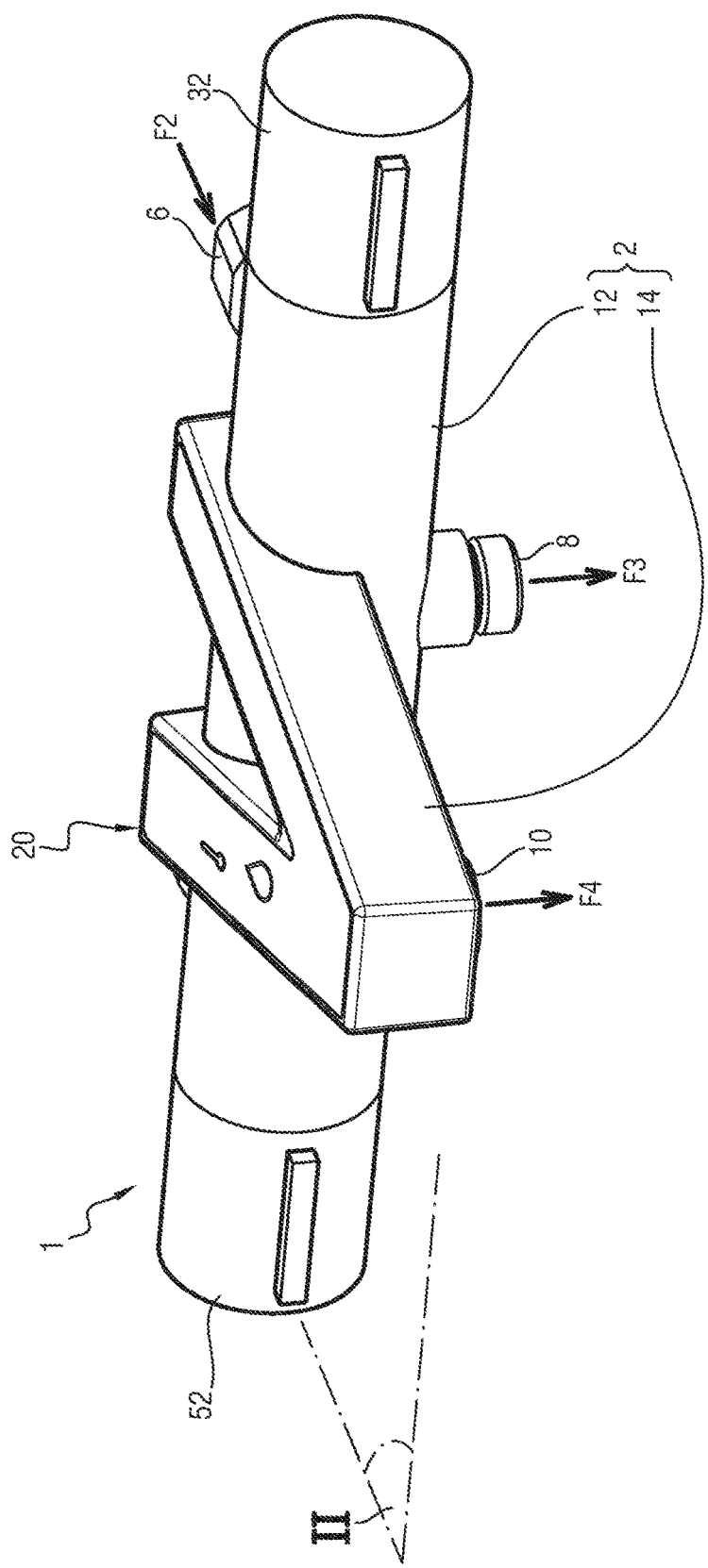
FIG. 1 is a perspective view of a mixing valve according to the invention.
Figure 2:
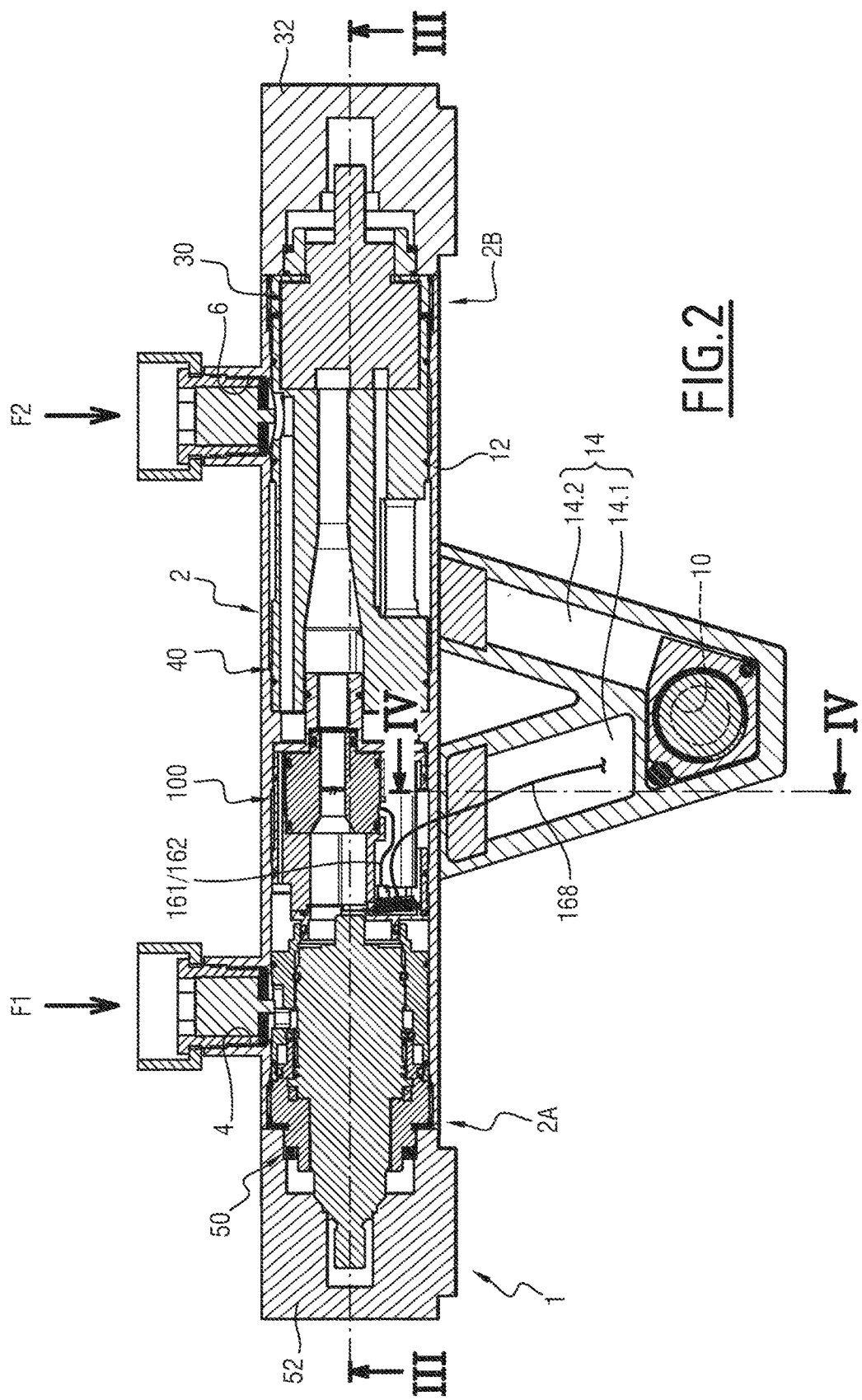
FIG. 2 is a cross-section in plane II of FIG. 1.
Figure 3:
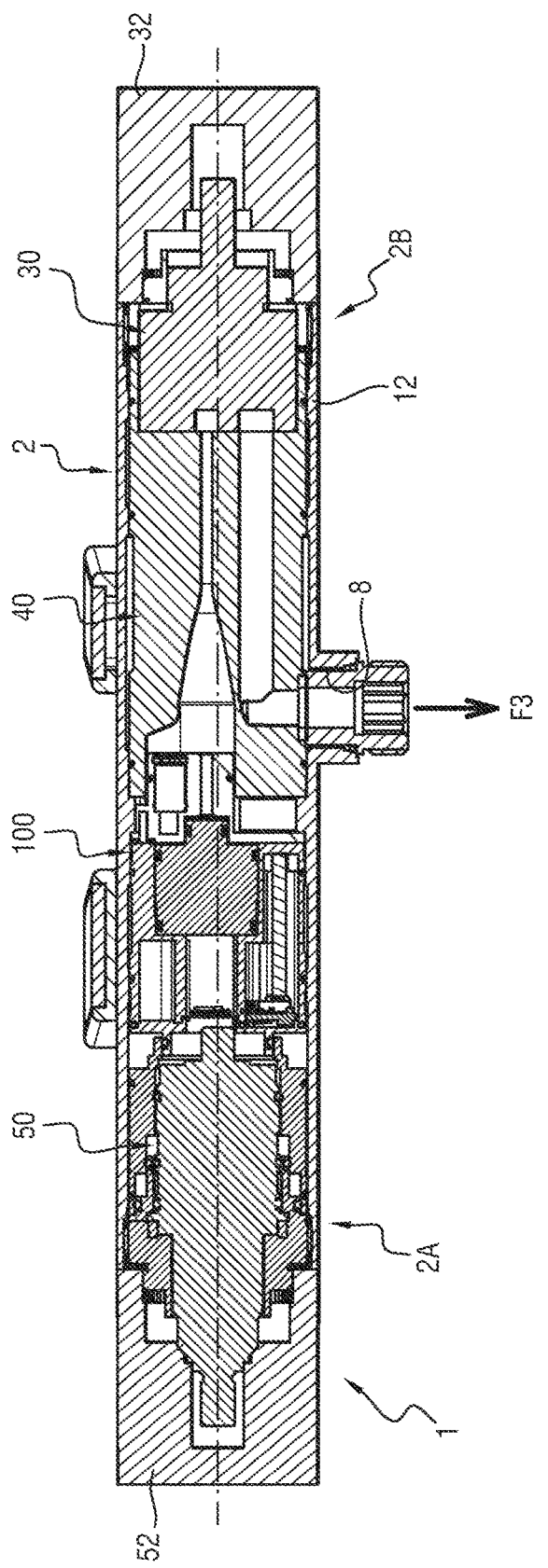
FIG. 3 is a cross-section according to the line III-III of FIG. 2.

As shown in FIGS. 1 to 4, the mixing valve 1 includes a valve body 2 that, in the embodiment considered in these figures, is provided with:
- a hot fluid inlet 4 provided to be supplied with hot fluid and to admit the latter inside the body of the valve 2, as indicated by an arrow F1 in FIG. 2,
- a cold fluid inlet 6 provided to be supplied with cold fluid and to admit the latter into the body of the valve 2, as indicated by an arrow F2 in FIG. 2
- a mixed fluid outlet 8 provided to discharge the mixed fluid outside the body of the valve 2, as indicated by an arrow F3 in FIGS. 1 and 3, and
- a mixed fluid outlet 10, other than the mixed fluid outlet 8, the mixed fluid outlet 10 being provided for discharging the mixed fluid outside the body of the valve 2, as indicated by an arrow F4 in FIG. 1.

According to one design that is both practical and adapted to the needs of the sanitary market, which is implemented in the embodiment considered in the figures, the body of the valve 2 presents a generally elongated shape, which is defined by a housing 12 of this valve body, this housing 12 being tubular and centered on a longitudinal axis of the valve body 2. The valve body 2 thus presents two longitudinal ends 2A and 2B that are opposite each other along the aforementioned longitudinal axis. The hot fluid inlet 4 and the cold fluid inlet 6 are arranged on the housing 12 and are separated from each other along the valve body 2, typically with a center distance provided to meet a standard or sanitary market usage. Here, the hot fluid inlet 4 is on the side of the longitudinal end 2A while the cold fluid inlet 6 is on the side of the longitudinal end 2B. As for the mixed fluid outlets 8 and 10, they are located, along the longitudinal direction of the valve body 2, between the hot fluid inlet 4 and the cold fluid inlet 6: more precisely, the mixed fluid outlet 8 is arranged on the housing 12 between the hot fluid inlet 4 and the cold fluid inlet 6 while the mixed fluid outlet 10 is arranged on a spout 14 of the valve body 2, extending transversely to the housing 12. This design of the valve body 2 is typically adapted to a bathtub shower: in this case, the distance between the hot fluid inlet 4 and the cold fluid inlet 6 is typically 150 mm, the mixed fluid outlet 8 is provided to open into a shower pipe, and the mixed fluid outlet 10 is provided to open directly above a bathtub basin.

Furthermore, the spout 14 presents a V-shaped profile, the tip of which faces away from the housing 12 and carries the mixed fluid outlet 10.

Before turning to the interior of the valve body 2 in more detail, it should be noted that, according to an optional arrangement that is implemented in the embodiment considered in the figures, the mixing valve 1 includes a display device 20, which is integral with the valve body 2. As clearly visible in FIGS. 1 and 4, the display device 20 comprises a screen 22, designed to display patterns visible to the user of the mixing valve 1, and an electronic control circuit 24 for controlling the patterns displayed by the screen 22. In practice, in the example considered in the figures, the display 22 is arranged on the V-shaped spout 14, in particular on a face of the latter intended to be turned towards the user, and the electronic control circuit 24 is arranged inside one of the two branches of the V-shaped spout 14, namely the branch which is turned towards the longitudinal end 2A of the valve body 2 and which is referred to as 14.1 in the figures.

According to one preferred embodiment, which is implemented in the figures, the screen 22 is a passive display medium, such as a translucent cover, incorporating pictograms or similar patterns, which are respectively backlit by LEDs of the electronic control circuit 24. In particular, by varying the color of these LEDs, controlled by the electronic control circuit 24, the user has corresponding information for the related pictogram.

According to another preferred embodiment, the display 22 is electrophoretic, in other words, the display 22 is an active digital display that uses electronic ink. This presents the advantage of very low power consumption, especially compared to a liquid crystal or LED display device.

In any case, the mixing valve 1 is provided to be, alternately, in two different states, namely:
- a so-called "flowing" state in which the mixed fluid exits through one and/or other of the mixed fluid outlets 8 and 10 with a flow rate greater than a minimum value, this minimum value being, in practice, too low to allow normal use of the mixing valve 1 and typically being less than 3 l/m, and
- a so-called "non-flowing" state, in which no fluid flows out of the mixed fluid outlets 8 and 10, or in which the mixed fluid flows out of one or both of the mixed fluid outlets 10 at a rate of flow lower than the aforementioned minimum value, even though the mixing valve 1 is normally supplied with hot and cold fluid through the hot fluid inlet 4 and the cold fluid inlet 6.

For this purpose, the mixing valve 1 comprises a flow control device 30 that allows the flow rate of the mixed fluid leaving the mixing valve 1 through the mixed fluid outlets 8 and 10 to be changed. The flow control device 30 thus allows the mixing valve 1 to be switched between the flowing state and the non-flowing state and advantageously allows, when the mixing valve is in the flowing state, to adjust the value of the flow rate of the mixed fluid exiting the valve body 2. The embodiment of the flow control device 30 is not limiting: as an example, the flow control device 30 is a ceramic disc system, it being understood that other embodiments, well known in the art, are conceivable.

Whatever its form, the flow control device 30 is arranged inside the valve body 2 so as to act on the flow of the mixed fluid inside the valve body, before this flow reaches the mixed fluid outlets 8 and 10 and is discharged outside the valve body 2. In the embodiment considered in the figures, the flow control device 30 is located at the longitudinal end 2B of the valve body 2.

In practice, the flow adjustment device 30 is controlled by a knob 32 or similar control member, accessible to the user from outside the valve body 2. In the embodiment considered in the figures, the knob 32 is mounted on the housing 12, at the longitudinal end 2B of the valve body 2 and is movable in rotation about the longitudinal axis of the valve body 2 for the purpose of controlling the flow control device 30.

In order to select the outlet, among the mixed fluid outlets 8 and 10, through which the mixed fluid exits the valve body 2, the mixing valve 1 considered here incorporates an inversion function. In the embodiment considered in the figures, this inversion function is performed jointly by the flow control device 30 and a distribution member 40. As can be seen in FIGS. 2 and 3, this distribution member 40 is fixedly arranged inside the valve body 2. The distribution member 40 is designed to channel to the inlet of the flow control device 30 the mixed fluid resulting from the mixing, operated inside the valve body 2, between the hot fluid and the cold fluid. The distribution member 40 is also designed to channel the mixed fluid from the outlet of the flow control device 30 either to the mixed fluid outlet 8, by preventing the mixed fluid from flowing towards the mixed fluid outlet 10, when the flow control device is in a first operating configuration, or towards the mixed fluid outlet 10, by preventing the mixed fluid from flowing to the mixed fluid outlet 8, when the flow control device is in a second operating configuration. In practice, the user switches the flow control device 30 from one to the other of these two operating configurations by acting on an ad hoc control member, accessible from outside the valve body 2. In the embodiment considered in the figures, the knob 32 thus controls the passage between the two configurations according to its angular position around the longitudinal axis of the valve body 2: for example, from an initial position of the knob 32 in which the flow control device 30 imposes the non-flowing state on the mixing valve 1, rotating the knob 32 in one direction of rotation switches the mixing valve to the flowing state and switches the flow control device 30 to the first configuration, while rotating the knob 32 in an opposite direction of rotation also switches the mixing valve to the flowing state but switches the flow control device 30 to the second configuration.

In the embodiment considered in the figures, the distribution member 40 is located in an intermediate longitudinal portion of the valve body 2, more precisely in the current portion of the housing 12. The distribution member 40 opens directly into the mixed fluid outlet 8 so as to supply the latter with the mixed fluid when the flow control member 30 is in the first configuration. Moreover, the distribution member 40 opens into the spout 14 so that the latter channels the mixed fluid to the mixed fluid outlet 10 so as to supply the latter with the mixed fluid when the flow control member 30 is in the second configuration: more precisely, the distribution member 40 opens here into one of the two branches of the V-shaped spout 14, namely the branch that is not occupied by the electronic control circuit 24 of the display device 20, in other words the branch that is referenced 14.2 in the figures.

In practice, insofar as, here, the distribution member 40 is partly located at the same level, along the body of the mixing valve 2, as the cold fluid inlet 6, the distribution member 40 is arranged to channel the cold fluid inside the valve body 2, from the cold fluid inlet 6 towards the longitudinal end 2A of the valve body 2. Of course, the embodiment of this arrangement of the distribution member 40 is not limiting, it being further noted that alternatively, the cold fluid 6 may, alternatively, be channeled inside the valve body 2 through dedicated arrangements of the latter. In any case, it is understood that, when the mixing valve 1 is flowing, the longitudinal part of the valve body 2, occupied by the distribution member 40, presents, on its outer surface, a surface temperature which results from the respective temperatures of the cold fluid and the mixed fluid which flow in this longitudinal part, in particular through the distribution member 40: this surface temperature does not present any risk of burning for the user who, for example, would come to place his hand on this longitudinal part of the valve body 2.

As can be seen from FIGS. 2 and 3, the mixing valve 1 also includes a thermostatic control device 50 that allows the temperature of the mixed fluid leaving the mixing valve to be controlled. This thermostatic control device 50 makes it possible, when the mixing valve 1 is flowing, to receive and mix the hot fluid coming from the hot fluid inlet 4 and the cold fluid coming from the cold fluid inlet 6, while making it possible to control the temperature of the mixed fluid resulting from this mixing and to send the mixed fluid to the mixed fluid outlets 8 and 10. The mixed fluid leaving the thermostatic control device 50 presents a temperature the value of which results from the control achieved by this device, independently of the respective pressure and temperature variations of the cold fluid and the hot fluid and independently of the flow rate of the mixed fluid, this within a certain pressure and flow rate range.

The embodiment of the thermostatic control device 50 is not limiting: by way of example, the thermostatic control device 50 is a thermomechanical system, as described in, among others, FR 2 774 740, FR 2 869 096 and FR 2 921 709.

Preferably, the thermostatic control device 50 is a thermostatic cartridge, in other words, a pre-assembled thermomechanical assembly, intended to be added in one piece to the mixing valve 1.

In any embodiment, the thermostatic control device 50 is arranged within the valve body 2 so as to act on the flow of hot fluid, cold fluid and mixed fluid within the valve body 2, after the flow of hot fluid and cold fluid have been admitted through the hot fluid inlet 4 and the cold fluid inlet 6 and before the flow of mixed fluid is sent to the mixed fluid outlets 8 and 10. In the embodiment considered in the figures, the thermostatic control device 50 is located at the longitudinal end 2A of the valve body 2, being partially located, along the valve body 2, at the same level as the hot fluid inlet 4, as clearly visible in FIG. 2: in this way, the hot fluid does not flow or flows very little in the longitudinal direction of the valve 2, before being treated by the thermostatic control device 50, in particular before being mixed with the cold fluid, which limits, or even avoids, the risks of the valve body 2 burning the user by contact.

In practice, the thermostatic control device 50 is controlled by a knob 52 or a similar control member, accessible to the user from the outside of the valve body 2: in the example considered in the figures, the knob 52 is mounted on the housing 12, at the level of the longitudinal end 2A of the valve body 2, and is movable in rotation about the longitudinal axis of the valve body 2 for the purpose of controlling the thermostatic control device 50.

Figure 4:
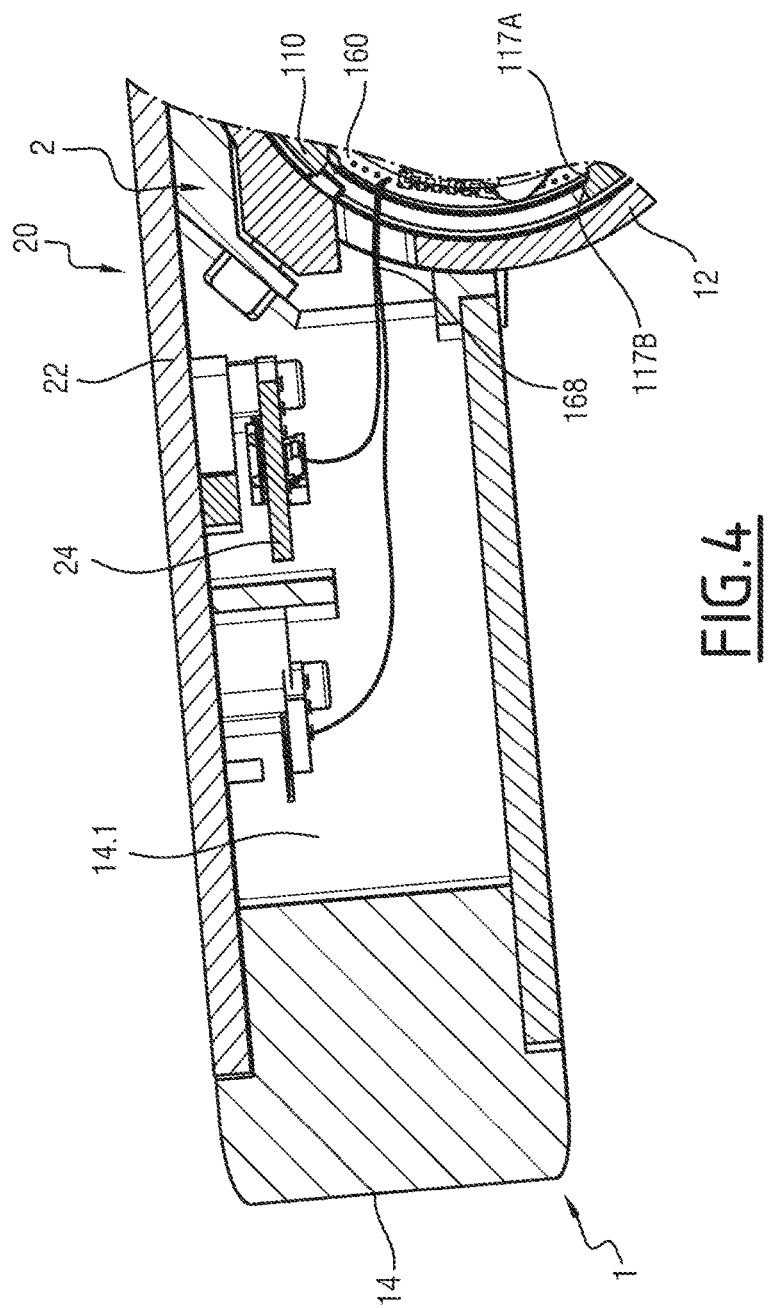
FIG. 4 is a cross-section according to the line IV-IV of FIG. 2.
Figure 5:
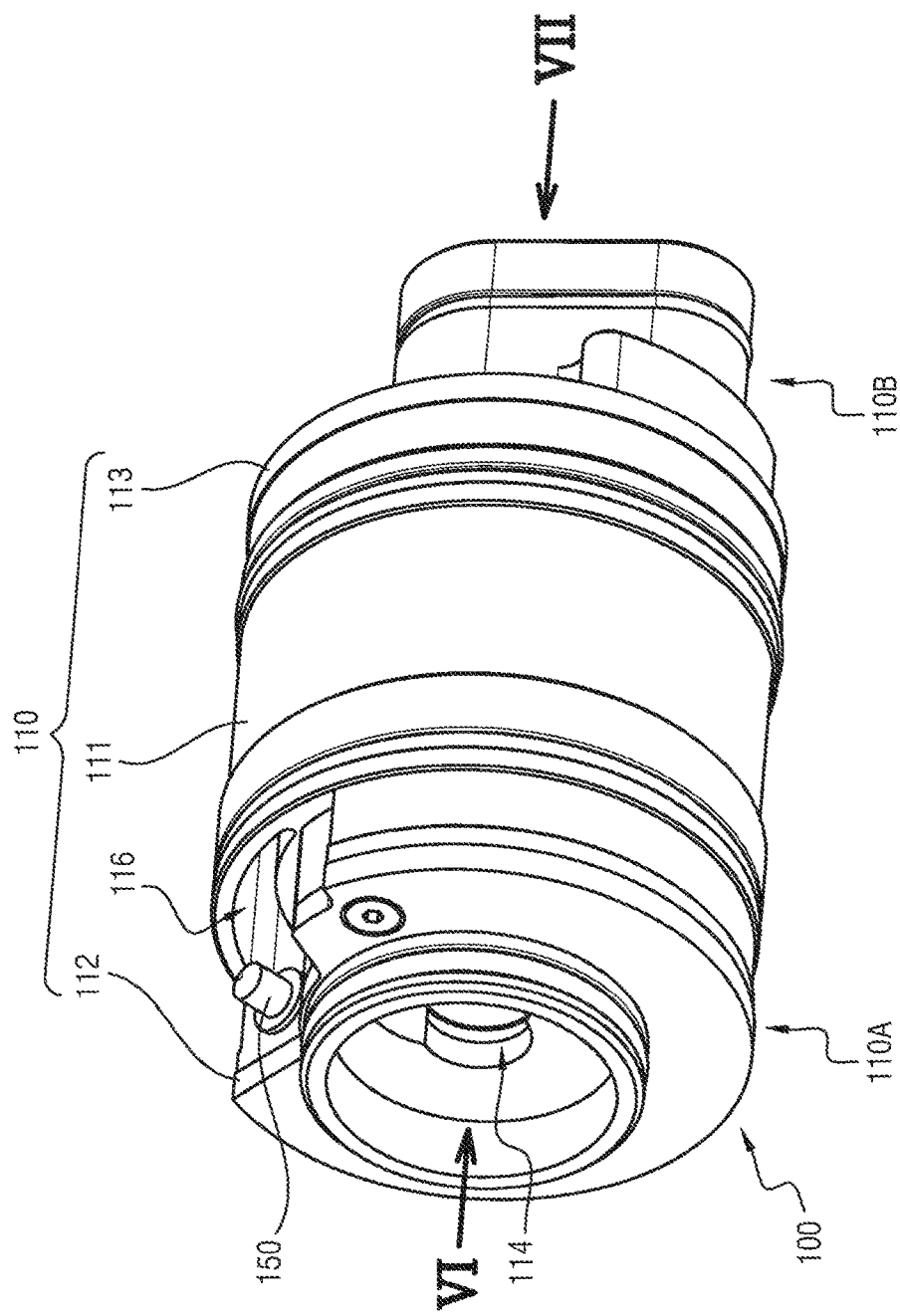
FIG. 5 is a perspective view of an instrumented device according to the invention, belonging to the mixing valve of the preceding figures.
Figure 6:
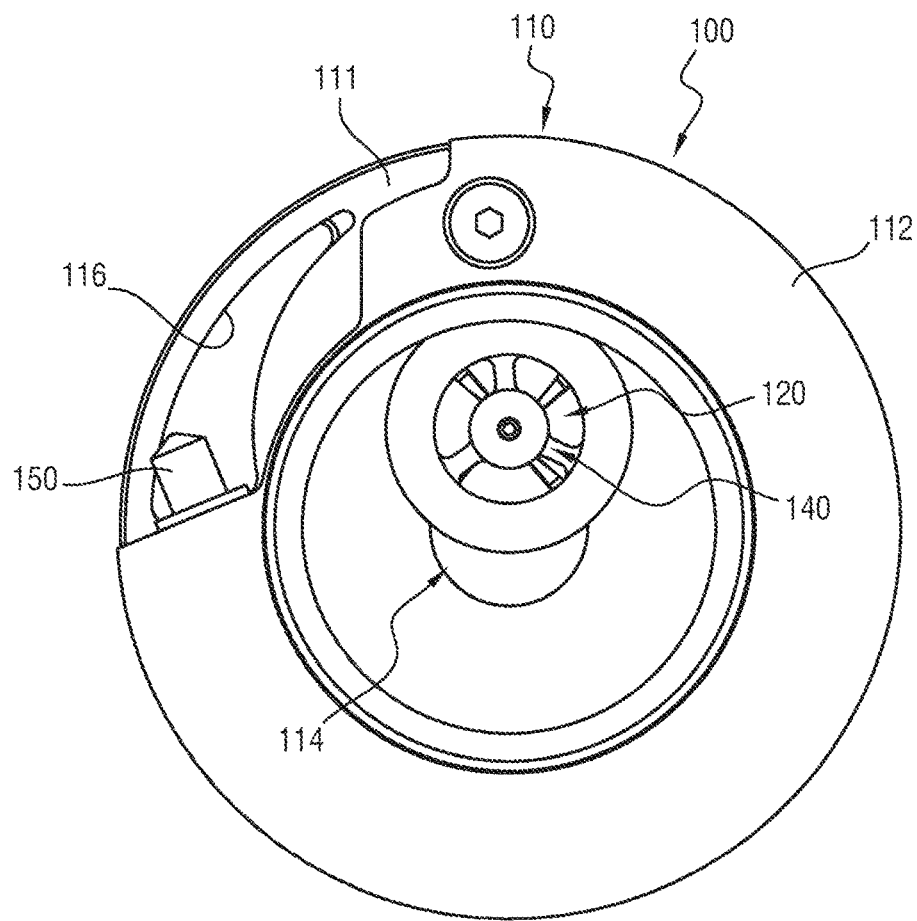
FIG. 6 is an elevation view according to arrow VI of FIG. 5.
Figure 7:
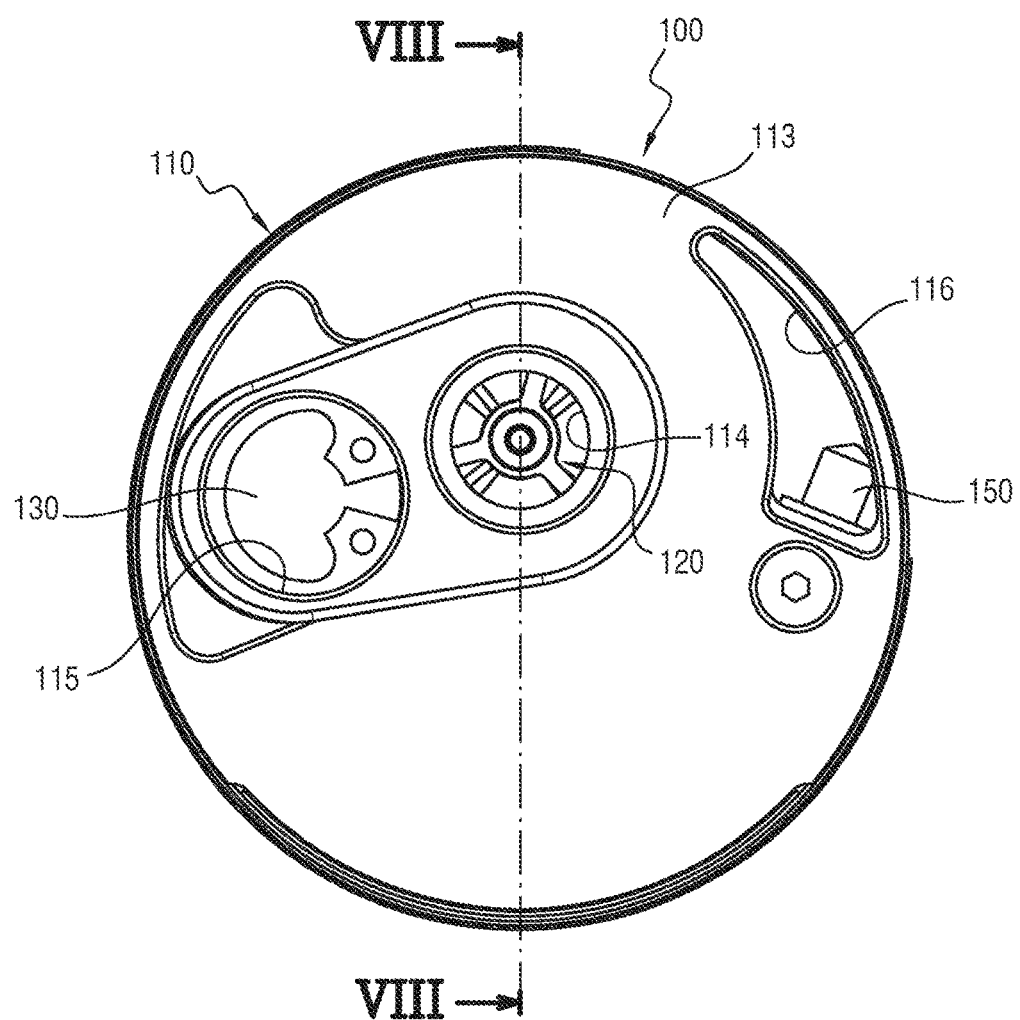
FIG. 7 is an elevation view according to arrow VII of FIG. 5.

As clearly visible in FIGS. 2 to 4, the mixing valve 1 further includes an instrumented device 100. As explained below, the instrumented device 100 allows to measure hydraulic characteristics inside the valve body 2, in particular, hydraulic characteristics of the mixed fluid before the latter reaches the mixed fluid outlets 8 and 10. This instrumented device 100 is designed as a stand-alone module, capable of being added in one piece to the mixing valve 1, in particular independently of the other components provided inside the valve body 2. The instrumented device 100 is thus shown alone in FIGS. 5 to 10, as an assembly that is pre-assembled independently of the rest of the mixing valve 1 and is ready to be mounted with the rest of the mixing valve 1.

To this end, as clearly visible in FIGS. 5 to 10, the instrumented device 100 includes a body 110 that is able to be added to the mixing valve 1 so as to be traversed by the mixed fluid flowing in the mixing valve. More specifically, as is clearly visible in FIGS. 2 to 4, the body 110 is able to be arranged inside the valve body 2 so as to be traversed by the mixed fluid flowing inside this valve body. In the example of the embodiment considered in the figures, the body 110 is arranged between the flow control device 30 and the thermostatic control device 50: when the mixing valve 1 is in the flowing state, the mixed fluid leaving the thermostatic control device 50 flows through the body 110 before reaching, if necessary, the distribution member 40 and, in any case, the flow control device 30. Of course, other relative arrangements within the valve body 2 between the instrumented device 100 and the other components of the mixing valve 1 are conceivable, as long as the mixed fluid passes through the body 110 of the instrumented device 100 before exiting the valve body 2.

In any case, the distinction between the flowing state and the non-flowing state applies, by extension, to the instrumented device 100, in the sense that the instrumented device is considered to be in the flowing state when mixed fluid passes through its body 110 with a flow rate greater than the aforementioned minimum value, while the instrumented device 100 is in the non-flowing state when the flow rate of the mixed fluid passing through it is less than this minimum value or even zero. Furthermore, in the following, the terms "upstream" and "downstream" are defined relative to the direction of flow of the mixed fluid through the body 110.

In the embodiment considered in the figures, the body 110 includes a casing 111 that extends between an upstream end 110A and a downstream end 110B of the body 110. The body 110 also includes, at its upstream end 110A, an upstream cover 112 and, at its downstream end 110B, a downstream cover 113. As is clearly visible in FIGS. 2 and 3, the upstream cover 112 fluidically connects the body 110 to the thermostatic control device 50, for the circulation of the mixed fluid therebetween, while the downstream cover 113 fluidically connects the body 110 and the distribution member 40, for the circulation of the mixed fluid therebetween. The casing 111 and the upstream 112 and downstream 113 channels are, for example, made of plastic.

Whatever the form of the body 110, the latter delimits a main channel 114, which connects the upstream 110A and downstream 110B ends of the body 110 to each other and into which the mixed fluid flows when the instrumented device 100 is in the flowing state. In the embodiment considered in the figures, the main channel 114 occupies a central region of the body 110 and is delimited successively by the upstream cover 112, the casing 111 and the downstream cover 113, being globally centered on a geometric axis X114, as clearly visible in FIGS. 6 to 10.

Inside the main channel 114 is arranged a turbine 120 of the instrumented device 100. In the flowing state of the instrumented device 100, the mixed fluid flowing in the main channel 114 passes through the turbine 120 which, under the effect of this fluid flow, generates an electric voltage which is, as explained later, used both as a source of electric power and as a signal giving information on the flow rate of the mixed fluid.

In practice, the embodiment of the turbine 120 is not limiting, as long as it is a hydraulic turbine, generating an electric voltage under the effect of the mixed fluid flowing through it when the instrumented device 100 is in the flowing state. As a preferred example, the turbine 120 is an axial micro-turbine which comprises a hollow cylindrical body, forming a stator, and a rotor provided with one or more blades arranged inside the stator and being able to rotate around an axis of rotation, which corresponds to the longitudinal axis of the stator and which, here, is coincident with the geometric axis X114. The rotor is then set in rotation when the mixed fluid flows through the micro-turbine. This micro-turbine also comprises an electromagnetic circuit to generate the aforementioned electric voltage when the rotor rotates. The use of such a micro-turbine is advantageous because it offers a good compromise between the size of the turbine 120 and the quality of the electric voltage signal provided by the turbine 120, in particular to obtain a satisfactory linearity of the signal despite the variations of the flow rate and of the fluidic pressure drop.

In addition to the main channel 114, the body 110 delimits a bypass channel 115 through which the mixed fluid flows through the body 110. The bypass channel 115 is provided to allow the mixed fluid flowing through the body 110 to bypass the turbine 120 arranged in the main channel 114. In other words, the bypass channel 115 allows the mixed fluid flowing through the body 110 to bypass the turbine 120.

Figure 10:
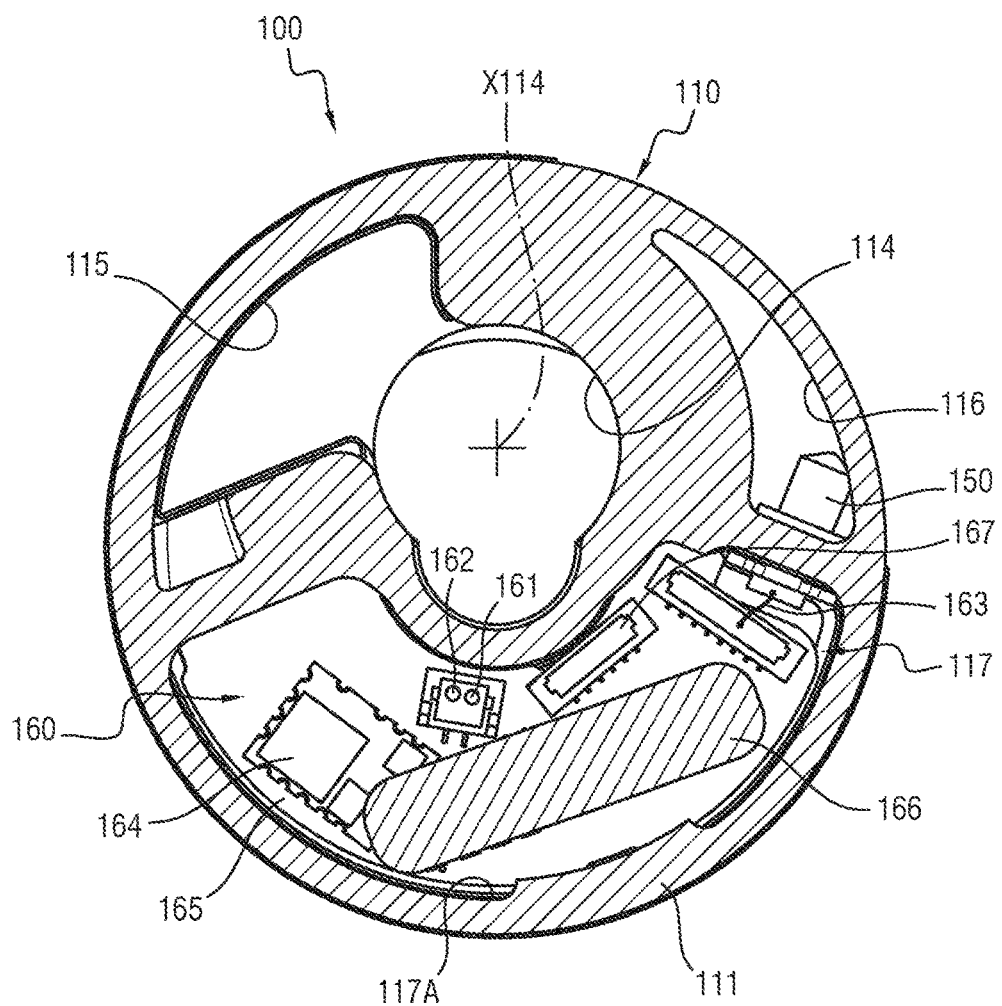
FIG. 10 is a cross-section according to the line X-X of FIG. 8.

In the embodiment considered in the figures, the bypass channel 115 is delimited by the upstream cover 112 and the casing 111, without, however, opening at the upstream end 110A of the body 110 through the upstream cover 112, but by opening transversely into the main channel 114, upstream of the turbine 120, as clearly visible in FIG. 10. In its downstream part, the bypass channel 115 bypasses the turbine 120, being successively delimited by the casing 111 and the downstream cover 113 through which the bypass channel opens onto the downstream end 110B of the body 110, as clearly visible in FIG. 9.

The bypass channel 115 can be delimited by the body 110 in various ways other than those just described, as long as, on the one hand, the turbine 120 is bypassed by the mixed fluid flowing in the bypass channel 115 and, on the other hand, at least part of the mixed fluid flowing through the body 110 passes through the main channel 114 by passing through the turbine 120 as long as the flow rate of the mixed fluid flowing through the body 110 is not zero. In other words, as soon as mixed fluid passes through the body 110, in particular when the instrumented device 100 is in the flowing state, all or part of this mixed fluid flows into the main channel 114 through the turbine 120 and, at the same time, part of the mixed fluid is likely to bypass the turbine 120 by flowing into the bypass channel 115. In other words, the turbine 120 is arranged in the main channel 114, while being bypassed by the bypass channel 115, so that, as soon as the flow rate of the mixed fluid flowing through the body 110 is non-zero, all or part of the mixed fluid flowing through the body passes through the main channel 114 while passing through the turbine 120 and, at the same time, part of the mixed fluid flowing through the body 110 is able to bypass the turbine by flowing in the bypass channel 115 between upstream and downstream of the turbine. Thus, the bypass channel 115 is not in sequence or "in series" with the main channel 114 but connects the upstream and downstream of the turbine 120 to each other separately from the main channel 114.

Furthermore, regardless of the form of the main channel 114 and the bypass channel 115, these channels are, when the instrumented device 100 is mounted in the mixing valve 1, fluidically connected to the mixed fluid outlets 8 and 10, here via the distribution member 40 and the flow control device 30, and allow the mixed fluid to be guided within the valve body 2 so that the mixed fluid is sent to these mixed fluid outlets 8 and 10 from the thermostatic control device 50 or, more generally, from a region of the valve body 2 where the cold fluid and the hot fluid mix.

In the embodiment considered in the figures, the instrumented device 100 includes a differential pressure valve 130 that is arranged in the bypass channel 115. In the example considered here, the differential pressure valve 130 is carried by the downstream cover 113. Regardless of the specific design of the differential pressure valve 130, the differential pressure valve 130 is designed to switch between a closed configuration and an open configuration. The differential pressure valve 130 is in the closed configuration when the pressure difference between upstream and downstream of the valve is less than a predetermined threshold and, in this closed configuration, the valve completely interrupts the flow of the mixed fluid in the bypass channel 115. The differential pressure valve 130 is in the open configuration when the pressure difference between upstream and downstream of the valve is greater than the aforementioned predetermined threshold and, in this open configuration, the valve allows the mixed fluid to flow into the bypass channel 115 downstream of the valve. Thus, it is understood that when the instrumented device 100 is in the flowing state, all of the mixed fluid flowing through the body 110 passes through the main channel 114 through the turbine 120 as long as the flow rate of this mixed fluid remains sufficiently low not to induce a pressure difference between upstream and downstream of the differential pressure valve 130 greater than the aforementioned predetermined threshold, since the differential pressure valve 130 then remains in a closed configuration, prohibiting any flow of fluid through the body 110 via the bypass channel 115. In this way, when the instrumented device 100 is in the flowing state but the flow rate of the mixed fluid entering the body 110 is low, all of this mixed fluid passes through the turbine 120 and therefore acts on the latter to generate electrical energy. On the other hand, in the event that the flow rate of the mixed fluid passing through the turbine 120 is so high that the pressure difference between upstream and downstream of the differential pressure valve 130 exceeds the aforementioned predetermined threshold, the valve switches to the open configuration, so that a portion of the mixed fluid passing through the body 110 flows into the bypass channel 115 bypassing the turbine 120, which then protects the latter from the effects of such a high flow rate, for example by preventing the turbine 120 from operating in overspeed.

Furthermore, in the embodiment considered in the figures, the body 110 delimits, in addition to the main channel 114 and the bypass channel 115, an additional channel 116 provided for the flow of cold fluid through the body 110. As can be seen in FIGS. 5 to 7 and 9, this additional channel 116 connects the upstream end 110A and the downstream end 110B of the body 110, while being completely separate from the main channel 114 and the bypass channel 115. In the example embodiment considered here, the additional channel 116 is delimited by the casing 111 and opens outside the body 110 through the downstream cover 113 at the level of the downstream end 110B while it opens outside the body 110 by avoiding the upstream cover 112 at the level of the upstream end 110A. Of course, other forms of implementation are conceivable for the additional channel 116 as long as the latter allows the cold fluid to pass through the body 110 while remaining independent of the flow of the mixed fluid through this body 110.

In any case, in the assembled state of the mixing valve 1, the additional channel 116 is fluidically connected to the cold fluid inlet 6 and allows the cold fluid to be guided inside the valve body 2 so that this cold fluid, after being admitted inside the valve body 2 through the cold fluid inlet 6, reaches the thermostatic control device 50 or, more generally, reaches a region of the valve body 2 where the cold fluid mixes with the hot fluid. It will be noted that the direction of flow of the cold fluid in the additional channel 116 is opposite to the direction of flow of the mixed fluid through the body 110 in the main channel 114 and in the bypass channel 115.

In this way, the body 110 is locally cooled by the flow of the cold fluid in the additional channel 116 and, within the mixing valve 1, the instrumented device 100 avoids the risk of the user burning by contact with the longitudinal part of the valve body 2 in which the instrumented device 100 is arranged.

Furthermore, in the embodiment considered in the figures, the instrumented device 100 includes a temperature sensor 140 able to measure the temperature of the mixed fluid flowing through the body 110. In practice, the specifics relating to this temperature sensor 140 are not limiting. According to a preferred embodiment, the temperature sensor 140 is arranged on the wall of the main channel 114 so as to be always swept by the mixed fluid flowing through the body 110 when the instrumented device is in the flowing state. In particular, the temperature sensor 140 is advantageously integrated inside the turbine 120, as in the example considered in the figures.

Also, in the embodiment considered in the figures, the instrumented device 100 also includes a temperature sensor other than the temperature sensor 140, namely a temperature sensor 150 able to measure the temperature of the cold fluid flowing through the body 110, via the additional channel 116. In the example considered here, the temperature sensor 150 is arranged at one end of the additional channel 116, being carried by the casing 111, as clearly visible on FIGS. 5 and 6. Again, the specifics relating to the temperature sensor 150 are not limiting.

For example, the temperature sensor 140 and, if applicable, the temperature sensor 150 are ceramic technology temperature sensors with a negative temperature coefficient. This technology has the advantage of being reliable and economical.

Figure 8:
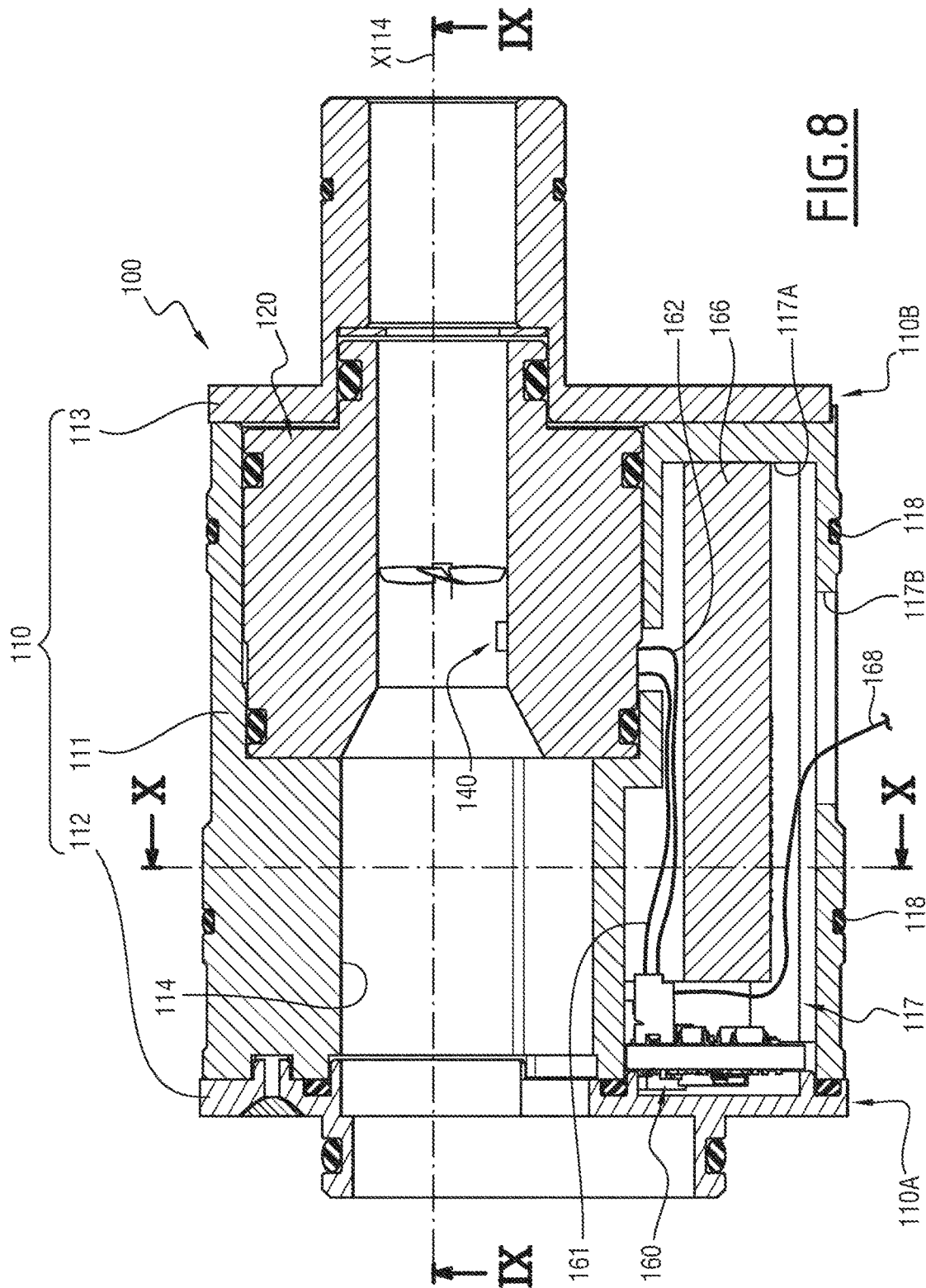
FIG. 8 is a cross-section according to the line VIII-VIII of FIG. 7.
Figure 9:
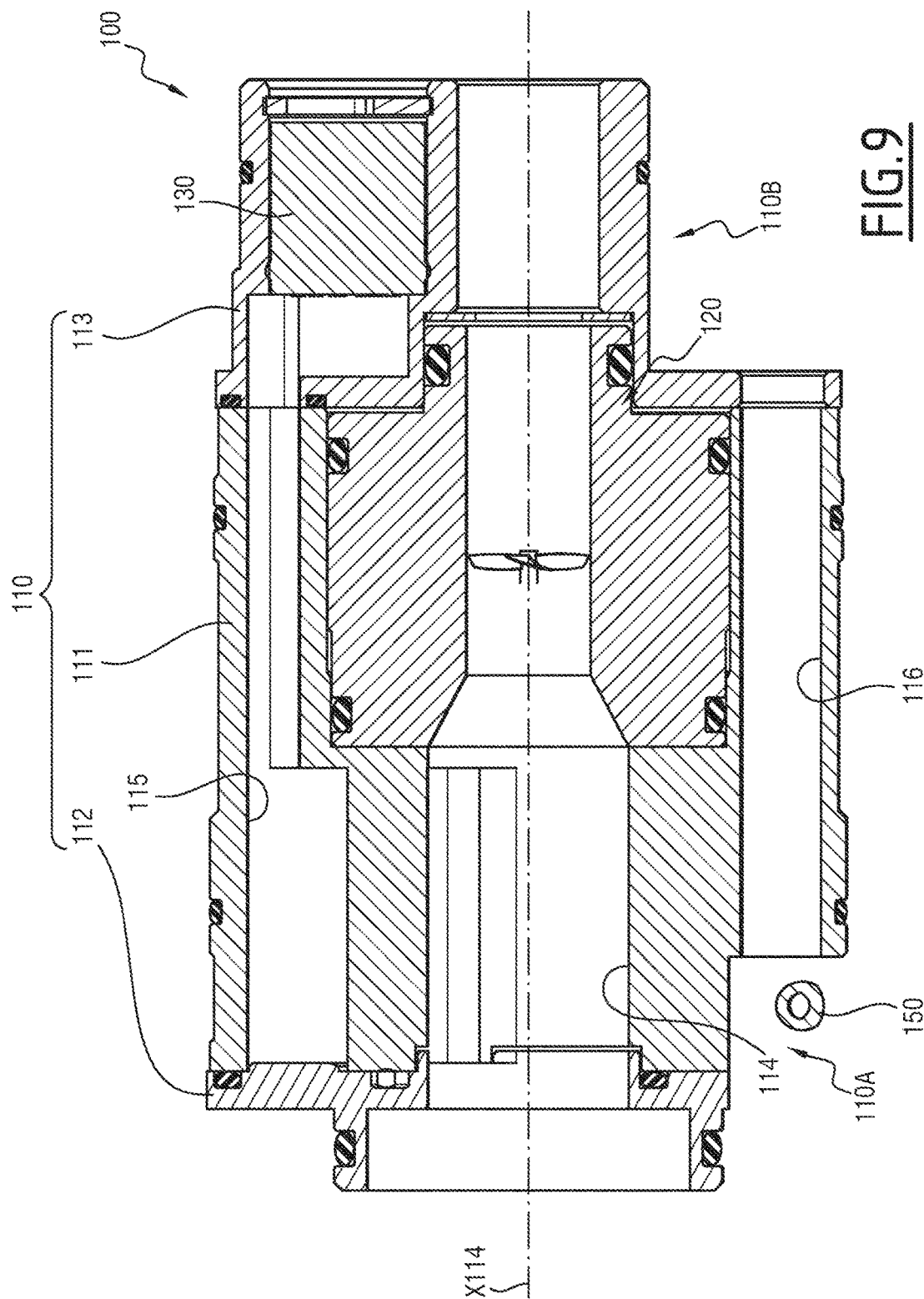
FIG. 9 is a cross section according to the line IX-IX of FIG. 8.

In order to collect, process and transmit data relating to the use of the mixing valve 1, the instrumented device 100 includes an electronic circuit 160, visible in FIGS. 8 and 10.

The electronic circuit 160 is arranged in a dry area 117 of the body 110, in other words, an area of the latter that is normally never brought into contact with the cold fluid, the hot fluid and the mixed fluid. Of course, the arrangement of the electronic circuit 160 in this dry area 117 of the body 110 is intended to preserve the integrity of the electronic circuit 160. The design of the dry area 117 is not limiting as long as it preserves the electronic circuit 160 from any contact with the fluids flowing through and around the body 110. In the embodiment considered in the figures, the dry area 117 comprises a housing 117A inside the body 110, which is delimited by the casing 111 and the upstream and downstream channels 112 and 113 and which is separated in a sealed manner from the main channel 114, the bypass channel 115 and the additional channel 116. With respect to the exterior of the body 110, the sealing of this housing 117A can be provided by completely closing this housing. This said, in the example of the embodiment considered in the figures, the aforementioned internal housing is not totally closed, but is connected to the outside of the body 110 by an opening 117B delimited by the body 110. To guarantee that the dry area 117 is sealed from the outside of the body 110 despite the presence of the opening 117B, this opening 117B is bordered by seals 118 which, when the body 110 is arranged inside the valve body 2, seal the outer part of the body 110, which is located between these seals and in which the opening 117B is located.

While being arranged in the dry area 117, the electronic circuit 160 is connected to the turbine 120 and to the temperature sensors 140 and 150, and this by respective electrical connections. More specifically, the electronic circuit 160 is connected to the turbine 120 by an electrical connection 161 and to the temperature sensor 140 by an electrical connection 162. As shown schematically in FIG. 8, these electrical connections 161 and 162 run at least partially in the dry area 117, being arranged inside the housing 117A. In the example of the embodiment considered here, in which the temperature sensor 140 is integrated inside the turbine 120, the electrical connections 161 and 162 are advantageously combined into a bus. As for the temperature sensor 150, it is connected to the electronic circuit 160 by an electrical connection 163 that, as is clearly visible in FIG. 10, extends at least in part in the dry area 117, inside the housing 117A.

The specifics relating to the electrical connections 161, 162 and 163 are not limiting, as long as these electrical connections, typically wired, are carried by the body 110. By way of example, rather than running inside the housing 117A of the dry area 117, one or more of the electrical connections 161, 162 and 163 can be overmolded by the constituent material of the body 110 or be arranged in ad hoc openings, provided in a sealed manner in the body 110.

As shown in FIGS. 8 and 10, the electronic circuit 160 comprises a calculator 164 that is supported, for example, by an electronic card 165. The design details of the calculator 164 are not limiting. As an example, this calculator 164 includes a logic unit, such as a microprocessor, as well as a computer memory and an electronic clock. More generally, the calculator 164 is a programmable electronic device, capable of executing pre-programmed processing instructions and of tracking itself in time, with at least temporary storage of the results coming from the data processed by the instructions. The reader may usefully refer to WO 2019/138027 for further details with respect to the calculator 164.

In any embodiment, the calculator 164 is able to:
determine a value for the flow rate of the mixed fluid flowing through the body 110, from the signal provided by the turbine 120 via the electrical connection 161,
if necessary, determining a value for the temperature of the mixed fluid flowing through the body 110, from the signal supplied by the temperature sensor 140 via the electrical connection 162, and
if necessary, determining a value for the temperature of the cold fluid flowing through the body 110, from the signal supplied by the temperature sensor 150 via the electrical connection 163.

In other words, the calculator 164 is programmed to provide the above two temperature values and the flow rate value, from the raw signals supplied by the turbine 120 and the temperature sensors 140 and 150, for each instant while the instrumented device 100 is in the flowing state. Again, the reader is referred to WO 2019/138027 for detailed explanations related to this aspect of the operation of the calculator 164. This being the case, with respect specifically to the determination of the flow rate value, it will be noted that the calculator 164 advantageously exploits the frequency of the signal supplied by the turbine 120, it being emphasized that a given frequency of the signal supplied by the turbine 120 corresponds to one and only one total flow rate of mixed fluid passing through the body 110, in other words, one and only one flow rate of the mixed fluid passing through the body 110 by the main channel 114 and, if applicable, by the bypass channel 115. In other words, even though, in the flowing state of the instrumented device 100, part of the mixed fluid bypasses the turbine 120 by passing through the bypass channel 115, the instructions executed by the calculator 164, typically the software embedded in the microprocessor of this calculator, are provided to accurately determine the total flow rate of the mixed fluid: for this purpose, the mathematical function linking this total flow rate and the frequency of the signal from the turbine 120 is provided in a bijective manner, by being determined by calculation and/or by prior calibration, before being programmed into the calculator 164. In practice, the definition of this bijective function is dependent on the structure of the main channel 114 and that of the bypass channel 115, which are designed accordingly, as well as the characteristics of the differential pressure valve 130. The accuracy of the result of this bijective function is furthermore advantageously improved by providing that the differential pressure valve 130 opens progressively, in other words, this valve is designed so that the flow rate of the mixed fluid in the bypass channel 115 increases progressively, as a function of the pressure difference between the upstream and downstream of the valve, over a range of at least 250 mbar: the bijective function, linking the frequency of the signal supplied by the turbine 120 and the total flow rate of the mixed fluid, is then smoother, in particular compared to a similar function used when the differential pressure valve 130 is "free" opening.

Furthermore, above the flow rate value relative to the mixed fluid, as well as, if applicable, the temperature value relative to the mixed fluid and/or the temperature value relative to the cold fluid, which are determined by the calculator 164, the latter can advantageously be programmed to determine other data that are calculated from this flow rate value and these temperature values, taking into account a cycle of use of the mixing valve 1, as explained in detail in WO 2019/138027 to which the reader may refer. In particular, the calculator 164 can then determine the energy required to heat the hot fluid for a particular use of the mixing valve 1, for example to enable showering.

Returning now to the description of the electronic circuit 160, it will be noted that the latter also comprises an electrical energy source 166 that is provided for electrically powering the calculator 164. This electrical energy source 166 is rechargeable, being able to be electrically powered by the turbine 120, via the electrical connection 162, when the instrumented device 100 is in the flowing state. The specifics of the electrical energy source 166 are not limiting as long as the electrical energy source is rechargeable. For example, the electrical energy source 166 includes a battery, in particular a lithium-ion battery, or at least one super-capacitor. Other examples are detailed in WO 2019/138027 to which the reader may refer.

Furthermore, as mentioned above, the electronic circuit 160 is provided for transmitting data relating to the use of the mixing valve 1, in other words, the data determined by the calculator 164.

According to a first possible implementation relative to this transmission, the electronic circuit 160 includes a wireless communication interface 167 that is schematically illustrated in FIG. 10. This wireless communication interface 167 is able to transmit data from the calculator 164 to the exterior of the instrumented device 100 via a wireless communication protocol. The specifics relating to this wireless communication interface 167 are not limiting. Preferably, the wireless communication protocol, used by this interface, is the BLE protocol, which is the acronym of the English expression "Bluetooth Low Energy" and which allows to transfer a large volume of data while consuming little electrical energy. Further examples and design details for the wireless communication interface 167 are given in WO 2019/138027 to which the reader may usefully refer. Regardless of the form of the wireless communication interface 167, the interface ensures the wireless communication of the electronic circuit 160 with either a user terminal, separate from the mixer valve 1, or a remote computer server, as explained in detail in WO 2019/138027.

According to a second possible implementation relating to the transmission of data to the outside of the instrumented device 100, this second possibility being cumulative with the first possibility mentioned above, the electronic circuit 160 includes an electrical connection 168, which is distinct from the electrical connections 161, 162 and 163 described above and which is able to connect the electronic circuit 160 to the display device 20. The electrical connection through this electrical connection 168 allows, at the same time, the display device 20 to be electrically powered by the electrical power source 166 and the data determined by the calculator 164 to be transmitted to this display device. As is clearly visible in FIGS. 2 and 8, the electrical connection 168 runs from the dry area 117 of the body 110, in particular from the interior of the housing 117A, to the electronic control circuit 24 of the display device 20, passing successively through the opening 117B of the dry area 117 and through the interior of the branch 14.1 of the V-shaped spout 14.

Furthermore, the electronic circuit 160 is advantageously provided to limit the energy it consumes and, if necessary, the energy consumed by the display device 20, in order to increase the autonomy of the electrical energy source 166. Again, WO 2019/138027 details various related arrangements, including providing that the electronic circuit 160 is switchable between a normal operating mode and a standby mode.

Taking into account the explanations given so far, it is understood that the instrumented device 100 is autonomous, from both an energy and hydraulic point of view. Indeed, in particular thanks to its turbine 120, its electrical connection 161 and its electrical energy source 166, the instrumented device 100 generates and stores by itself the electrical energy necessary for the operation of its calculator 164 and its wireless communication interface 167, and even the electrical energy necessary for the operation of the display device 20. Furthermore, the body 110 can be directly installed within the mixing valve 1, by fluidically connecting to the other components of this mixing valve, arranged within the valve body 2, without the instrumented device 100 being functionally dependent on these other components. The instrumented device 100 thus proves to be particularly compact, especially in connection with the structural design of its body 110.

Finally, various arrangements and variants of the instrumented device 100 and the mixing valve 1 described so far are also possible. By way of example, considered individually or in combination with each other:

Alternatively, the instrumented device 100 can be devoid of the differential pressure valve 130. In this case, the bypass channel 115 allows the free flow of the mixed fluid between the upstream end 110A and the downstream end 110B of the body 110, the wall of the bypass channel being preferably provided with one or more restrictions each inducing a fixed pressure drop. It is understood that the mixed fluid passing through the body 110 is systematically distributed between the main channel 114 and the bypass channel 115, regardless of the flow rate of this mixed fluid. In particular, even when the flow rate of the mixed fluid passing through the body 110 is low while still being sufficient for the instrumented device to be in the flowing state, a portion of this mixed fluid bypasses the turbine 120 by passing through the bypass channel 115, unlike the embodiment considered in the figures where the flow of the mixed fluid through the bypass channel 115 is only effective when the flow rate of the mixed fluid entering the body 110 exceeds a certain value related to the pressure threshold at which the differential pressure valve 130 changes from its closed configuration to its open configuration. This variant is even more compact and less expensive than the embodiment considered in the figures, due to the absence of the differential pressure valve or a similar member, but when, in the flowing state, the flow rate of the mixed fluid is too low, the turbine 120 produces less energy, or even no energy at all, and no longer provides a signal that can be used by the calculator 164 to return to a flow rate value.

Designs other than the display device 20 considered above can be envisaged as a remote device which, while being separate from the body 110 of the instrumented device 100 but carried by the valve body 2, is electrically connected to the electronic circuit 160 so as to be, both, powered by the electrical energy reserve 166 and to receive data from the calculator 164, in particular for the purposes of controlling this remote device. Thus, in addition to devices providing physical information feedback directly to the user, such as sound information and/or visual information similar to that provided by the display device 20, this remote device may, for example, include at least one solenoid valve or, more generally, an actuator.

Rather than the valve body 2 being provided with two mixed fluid outlets such as outlets 8 and 10, a single mixed fluid outlet may be provided.

The additional channel 116 may be provided for the flow, through the body 110, of a fluid other than the cold fluid, in particular the hot fluid, or a fluid other than the cold, hot, and mixed fluids considered thus far.

In addition to the temperature sensors 140 and 150, the body 110 can, optionally, be provided with one or more other sensors, each of which is connected to the electronic circuit 160 by an electrical connection carried by the body 110 and the respective signals of which are processed by the calculator 164 in order to return to corresponding values of hydraulic characteristics other than the temperature and flow rate values detailed above in connection with the embodiment considered in the figures. These other sensors are, for example, a pressure sensor, a pH sensor, a water hardness sensor, a water potability sensor, a sensor for detecting a chemical compound or microbial activity, etc.

What is claimed is:

1. An instrumented device, comprising:
a body that:
is able to be added to a mixing valve provided for producing a mixed fluid by mixing between a hot fluid and a cold fluid which are supplied to the mixing valve, and
delimits a main channel and a bypass channel, which are provided for flow of the mixed fluid through the body;
a turbine which is arranged in the main channel, being bypassed by the bypass channel, so that, when a flow rate of the mixed fluid flowing through the body is not zero all or part of the mixed fluid flowing through the body passes through the main channel through the turbine and, at the same time, part of the mixed fluid flowing through the body is able to bypass the turbine by flowing in the bypass channel between upstream and downstream of the turbine; and
an electronic circuit, which is arranged in a dry area of the body, and which is connected to the turbine by a first electrical connection which is carried by the body,
wherein the electronic circuit comprises:
a calculator which is able to determine a flow rate value for the flow rate of the mixed fluid flowing through the body, from a signal supplied by the turbine via the first electrical connection, and
an electrical power source, which is rechargeable and is adapted both to electrically power the calculator and to be electrically powered by the turbine via the first electrical connection.

2. The instrumented device according to claim 1, wherein the instrumented device further includes a differential pressure valve, which is arranged in the bypass channel and is designed to switch between a closed configuration, in which the valve interrupts flow of the mixed fluid in the bypass channel when the pressure difference between upstream and downstream of the valve is less than a predetermined threshold, and an open configuration, in which the valve allows the mixed fluid to flow into the bypass channel downstream of the valve when the pressure difference between upstream and downstream of the valve is greater than said predetermined threshold.

3. The instrumented device according to claim 2, wherein the differential pressure valve is designed to cause a flow rate of the mixed fluid in the bypass channel to increase gradually as a function of the pressure difference between upstream and downstream of the valve over a range of at least 250 mbar.

4. The instrumented device according to claim 1,
wherein the instrumented device further includes a first temperature sensor that is able to measure the temperature of the mixed fluid flowing through the body,
wherein the electronic circuit is connected to the first temperature sensor by a second electrical connection that is carried by the body, and
wherein the calculator is also able to determine a first temperature value for the temperature of the mixed fluid flowing through the body, from a signal provided by the first temperature sensor via the second electrical connection.

5. The instrumented device according to claim 4, wherein the first temperature sensor is integrated within the turbine.

6. The instrumented device according to claim 5, wherein the first electrical connection and the second electrical connection are combined into a bus.

7. The instrumented device according to claim 1,
wherein the body further delimits an additional channel that is provided for flow of the cold fluid through the body,
wherein the instrumented device further includes a second temperature sensor that is able to measure the temperature of the cold fluid flowing through the body,
wherein the electronic circuit is connected to the second temperature sensor by a third electrical connection that is carried by the body, and
wherein the calculator is also able to determine a second temperature value for the temperature of the cold fluid flowing through the body, from a signal supplied by the second temperature sensor via the third electrical connection.

8. The instrumented device according to claim 1, wherein the electronic circuit further comprises a wireless communication interface, which is able to transmit to exterior of the instrumented device, via a wireless communication protocol, data determined by the calculator.

9. The instrumented device according to claim 1, wherein the instrumented device further includes a fourth electrical connection which is able to connect the electronic circuit to a remote device, separate from the body, so as to, both, electrically power the remote device from the electrical power source and transmit to the remote device data determined by the calculator.

10. A mixing valve, comprising:
an instrumented device, comprising:
a body that delimits a main channel and a bypass channel, which are provided for flow of a mixed fluid through the body,
a turbine which is arranged in the main channel, being bypassed by the bypass channel, so that, when a flow rate of the mixed fluid flowing through the body is not zero all or part of the mixed fluid flowing through the body passes through the main channel through the turbine and, at the same time, part of the mixed fluid flowing through the body is able to bypass the turbine by flowing in the bypass channel between upstream and downstream of the turbine; and
an electronic circuit, which is arranged in a dry area of the body, and which is connected to the turbine by a first electrical connection which is carried by the body, wherein the electronic circuit comprises:
a calculator which is able to determine a flow rate value for the flow rate of the mixed fluid flowing through the body, from a signal supplied by the turbine via the first electrical connection, and
an electrical power source, which is rechargeable and is adapted both to electrically power the calculator and to be electrically powered by the turbine via the first electrical connection; and
a valve body which is provided with a hot fluid inlet provided to be supplied with a hot fluid, a cold fluid inlet provided to be supplied with a cold fluid, and at least one mixed fluid outlet provided to discharge to the outside of the valve body a mixed fluid resulting from the mixing inside the valve body between the hot fluid and the cold fluid,
wherein the body of the instrumented device is arranged inside the valve body such that the main channel and the bypass channel are fluidically connected to the at least one mixed fluid outlet.

11. The mixing valve according to claim 10, wherein the mixing valve further includes a display device, which is:
integral with the valve body,
separate from the body of the instrumented device, and
electrically connected to the electronic circuit of the instrumented device so as to be electrically supplied by the electrical power source and to receive data from the calculator.

12. The mixing valve according to claim 10,
wherein the mixing valve further comprises:
a flow control device, which is arranged inside the valve body, and which is able to control the flow rate of the mixed fluid sent to the at least one mixed fluid outlet, and
a thermostatic control device, which is arranged inside the valve body and which is able to mix the hot fluid from the hot fluid inlet and the cold fluid from the cold fluid inlet and to control the temperature of the mixed fluid supplied to the at least one mixed fluid outlet, and
wherein the body of the instrumented device is arranged between the flow control device and the thermostatic control device.

13. The mixing valve according to claim 12,
wherein the valve body presents an elongated shape,
wherein the hot fluid inlet and the cold fluid inlet are separated from each other along the valve body,
wherein the thermostatic control device is located, along the valve body, at the same level as the hot fluid inlet, and
wherein the body further delimits an additional channel that is provided for flow of the cold fluid through the body,
wherein the instrumented device further includes a second temperature sensor that is able to measure the temperature of the cold fluid flowing through the body,
wherein the electronic circuit is connected to the second temperature sensor by a third electrical connection that is carried by the body,
wherein the calculator is also able to determine a second temperature value for the temperature of the cold fluid flowing through the body, from a signal supplied by the second temperature sensor via the third electrical connection, and
wherein the additional channel of the body of the instrumented device is fluidically connected to the cold fluid inlet.

14. The mixing valve according to claim 12, wherein the thermostatic control device is a pre-assembled thermostatic cartridge.

* * * * *